United States Patent [19]
Kennedy

[11] Patent Number: 4,967,698
[45] Date of Patent: Nov. 6, 1990

[54] ELASTICALLY RESILIENT COLLAR CONTAINING INSECT-KILLING MEDICAMENT

[76] Inventor: Michael D. Kennedy, 6166 Hancock Ave., San Jose, Calif. 95123

[21] Appl. No.: 383,756

[22] Filed: Jul. 24, 1989

[51] Int. Cl.⁵ .................. A01K 27/00; A01K 13/00
[52] U.S. Cl. .................................. 119/106; 119/156
[58] Field of Search ............................. 119/106, 156

[56] References Cited

U.S. PATENT DOCUMENTS

| | | | |
|---|---|---|---|
| 254,156 | 2/1882 | Ricker et al. | 119/106 |
| 883,611 | 3/1908 | Barad et al. | 119/106 |
| 971,392 | 9/1910 | Micka | 119/106 |
| 1,203,590 | 11/1916 | Day | 119/156 |
| 2,734,483 | 2/1956 | Peo | 119/156 |
| 2,791,202 | 5/1957 | Doyle | 119/106 |
| 2,989,030 | 6/1961 | Draheim | 119/106 |
| 3,814,061 | 6/1974 | Aries et al. | 119/106 |
| 4,184,452 | 6/1980 | Buzzell et al. | 119/156 |
| 4,218,991 | 8/1980 | Cole | 119/156 |
| 4,425,874 | 1/1984 | Child | 119/156 |

FOREIGN PATENT DOCUMENTS 286728 10/1987 European Pat. Off. ............ 119/106

Primary Examiner—Paul J. Hirsch
Attorney, Agent, or Firm—John J. Leavitt

[57] ABSTRACT

Presented is an elastically resilient collar for application to a pet, such as a cat or dog, for the control of fleas and other insect pests that might infest the animal. Structurally, in one aspect, the collar comprises a helically wound member forming an elongated void within which is deposited an appropriate medicament for killing insect pests. In another aspect, the helically wound structure may itself be formed from a synthetic resinous material having embedded therein the insect killing medicament.

17 Claims, 1 Drawing Sheet

ELASTICALLY RESILIENT COLLAR CONTAINING INSECT-KILLING MEDICAMENT

BACKGROUND OF THE INVENTION

1. Field of the Invention.

This invention relates to devices for killing insects, and particularly to collar-like devices such as are used on domestic pets such as dogs and cats for killing insects such as fleas and ticks.

2. Description of the Prior Art.

The broad concept of attaching to or suspending from a wide variety of animals and fouls devices bearing insect killing medicaments is an old concept. Thus, U.S. Pat. No. 1,203,590 discloses a split tubular band for application about the leg of poultry for the purpose of killing the lice with which poultry are frequently infested.

Again, U.S. Pat. No. 3,687,114 describes a pendant for suspension from a conventional collar, the pendant being generally a cylindrical container having apertures in the cylindrical walls, and containing an appropriate ingredient the fumes of which upon sublimation pass through the apertures and come in contact with the skin of the pet wearing the pendant.

U.S. Pat. No. 2,734,483 discloses a flea repelling animal collar that comprises a flexible one-piece loosely woven fabric tube having both ends closed and containing a flea repelling powder. One end of the fabric tube is provided with a ring while the other end is provided with a pair of tiestraps enabling attachment of the collar about the neck of an animal.

U.S. Pat. No. 4,047,505 discloses an insect repellant collar that is not only useful for animals, but is also useful for people. This device is quite similar to the device disclosed in U.S. Pat. No. 2,734,483 in that it provides an elongated tube at least one wall of which is provided with apertures through which an insect repellant may pass to repel insects. The tube also contains a layer of material to absorb moisture, and the ends of the tube are provided at opposite ends with the felt and hook material commonly sold commercially under the trademark "Velcro".

U.S. Pat. No. 4,350,122 discloses a collar structure for trapping fleas and other insects that might infest a dog or a cat, the collar being tubular and having sticky material within the tubular structure and apertures leading thereinto through which the fleas and insects may enter. When inside the tubuar collar, the insects become trapped in the sticky material and eventually die.

One of the disadvantages of all of the structures described in the patents noted above is that any given model of the device is limited in the size to which it may be extended, thus requiring the manufacture of various sizes of devices to satisfy a full range of needs. Accordingly, it is one of the important objects of the present invention to provide and elastically resilient structure that contains the insect killing medicament in a manner that permits elastic expandability of the collar to fit many different sizes of animals.

It is generally regarded best that the insect killing medicaments used in so called "flea" collars not come in contact with the skin of the animal wearing the collar. Obviously, in collars in which the insect killing medicament is incorporated directly in the material from which the collar is formed this becomes an impossibility since the collar, once applied, is in direct contact with the animal's skin and fur. Accordingly, another important object of the invention is the provision of an elastically resilient collar that contains the insect containing medicament but which retains the insect killing medicament spaced from the skin of the animal wearing the collar.

Still another object of the invention is the provision of an endless elastically resilient collar structure formed from spirally arranged coils that define an elongated space or cavity conforming to the configuration of the elastically resilient coils, yet which provides spaces between the successive coils for the evaporation of the insect killing medicament, the coils themselves spacing the insect killing medicament from the skin of the animal wearing the collar.

The invention possesses other objects and features of advantage, some of which, with the foregoing, will be apparent from the following description and the drawings. It is to be understood however, that the invention is not limited to the embodiments illustrated and described, since it may be embodied in various forms within the scope of the appended claims.

SUMMARY OF THE INVENTION

In terms of broad inclusion, the elastically resilient collar of the invention containing insect killing medicament or insecticide comprises an elongated strip of an appropriate material, which may be either metal or an appropriate synthetic resinous material, the elongated strip being formed into successive spirally wound consecutive coils and the ends of the elongated strip being connectable or connected so as to form an endless ring. The elastically resilient collar may be fabricated so that when collapsed or contracted, the consecutive coils lie closely adjacent, even abutting each other, yet containing within the space defined by the coils an appropriate insect killing medicament. On the other hand, because of the elastically resilient interconnection of the consecutive coils, the collar may be expanded so as to uniformally cause spacings between the consecutive coils, thus opening the collar structure to the passage of fumes from the insect killing medicament contained within the elastically resilient collar structure. In this respect, it will be apparent that the consecutive coils of the spring-like collar structure may be formed circularly, rectangularly, or even in a square configuration, and that the insect killing medicament contained therewithin, may constitute independently fabricated spheres appropriately spaced about the collar structure, or an elongated cylindrical member, the ends of which are unattached so as to permit expansion of the collar structure and relative movement of the insect killing medicament in relation to the coils, or, in conjunction with a generally rectangular spring-like structure, the insect killing medicament may be in the form of a generally flat and elongated strap that conforms generally to the inner configuration of the spring-like collar structure. Again, the ends of the strap-like insect killing medicament strap are unattached so as to permit relative motion between the elastically expansible collar structure and the strap-like structure of insect killing medicament. In like manner, when the configuration of the successive coils possess a generally square configuration, the insect killing medicament may be formed into an elongated bar-like flexible strap enclosed within the elastically resilient collar structure, or may constitute a multiplicity of separate insect killing medicament spheres spaced about the collar and retained therein by the closely spaced successive coils. In another aspect of the invention, the elastically resilient collar may be formed from an appropriate synthetic resinous material within which material is embedded or contained the insect killing medicament. In this aspect of the invention, it is preferable that the insect killing medicament be of a type that is not harmful to the animal if it comes into contact with the skin.

DESCRIPTION OF THE PREFERRED EMBODIMENT

Figure 1:
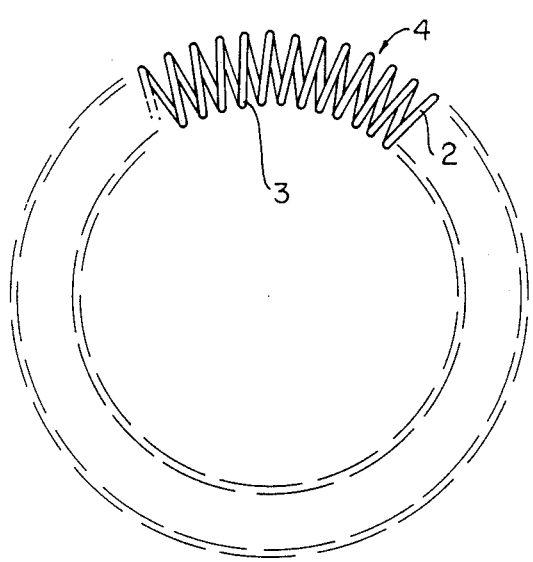
FIG. 1 is a plan view illustrating the elastically resilient collar structure fabricated from insect killing material such as an appropriate synthetic resinous material impregnated with the insect killing medicament.

Referring to the drawings, there is there illustrated five different embodiments including the same inventive concept, namely, the fabrication of an elastically expandable collar structure containing an insect killing medicament or insecticide. In the embodiment of FIG. 1, the elastically expandable collar is formed from an elongated strip 2, preferably cylindrical in its cross-sectional configuration, and formed into a series of successive spirally wound coils 3, with the opposite ends of the elongated strip 2, interconnected as by "welding" so as to define an endless ring designated generally by the numeral 4. In this embodiment of the invention, the insect killing medicament is incorporated directly into the elongated strip 2, such as by impregnation of the material from which the strip is fabricated. In this embodiment, this is preferably a synthetic resinous material which functions structurally to form the endless ring 4, and which functions also as a carrier for the insect killing medicament. In this embodiment of the invention, in which the insect killing medicament is preferably of a type that is not harmful to humans or to animals, such as cats and dogs that might be equipped with the elastically resilient collar, natural sublimation of the insect killing medicament from the carrier material diffuses through the animal's fur and kills fleas or ticks with which it comes in contact. It will be seen that because of the spiral winding of the coils 3, the elastically resilient collar may be expanded to fit many different sizes of animals. It should also be understood that this elastically resilient collar is not intended as the type of collar to be used to restrain a pet, the sole purpose being to function as a carrier for the insect killing medicament.

While it functions as a carrier for the insect killing medicament, it also offers the opportunity of fabricating the elastically resilient collar from many different colors, the colors being useable as a code designating the type of insect killing medicament incorporated into the elastically resilient collar, or being used merely for esthetic purposes to make the collars more attractive.

Figure 2:
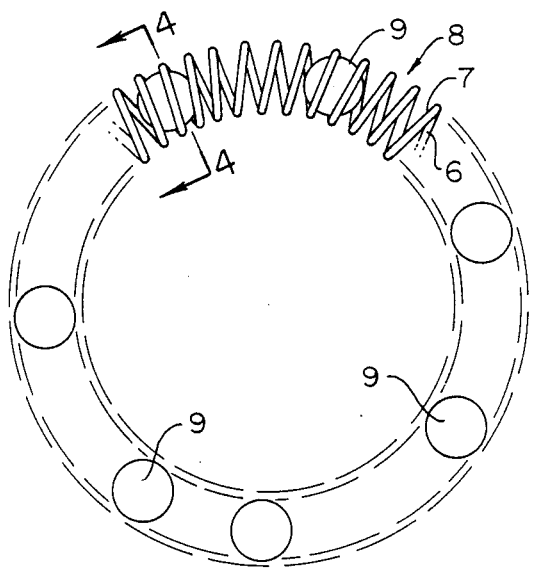
FIG. 2 is a plan view illustrating the elastically resilient collar structure of the invention formed into an endless ring by spirally wound consecutive coils of an appropriate material such as metal or synthetic resinous material, with the interior of the coils being utilized to retain independent, circumferentially spaced spheres of insect killing medicament.

In the embodiment of the invention illustrated in FIG. 2, which constitutes the preferred embodiment as described herein, there is again provided an elongated strip 6, preferably formed from an appropriate metal, such as spring steel, or stainless steel, and again having a circular cross-section. The elongated strip 6 is spirally wound to provide successive coils 7, and the opposite ends of the elongated strip are "welded" so as to conform the strip into an endless ring 8. The natural elasticity of the spirally coiled strip 6 when formed into an endless ring enables the ring to be expanded or contracted, the spacing between the separate coils 7 varying as needed to accommodate different sizes of animals. Thus, the elastically resilient collar illustrated in FIG. 2 may easily be applied to the small neck of a cat, for instance, and just as easily be applied to the much larger neck of a large dog.

In this embodiment of the invention, contained within the endless ring 8 formed by the successive spirally wound coils 7, are a plurality of spheres 9, each formed from an appropriate composition containing and forming the carrier for the insect killing medicament. For instance, the spheres 9 may be formed from appropriate inert ingredients impregnated with 2,2-dichlorovinyl dimethyl phosphate, a recognized flea and tick insecticide. The 2,2-dichlorovinyl dimethyl phosphate is such that body heat from the pet wearing the elastically expandable collar causes sublimation of the active chemical, the fumes then passing between the coils 7 of the spring-like endless ring 8 and into the animal's fur, from where it passes over the animal's skin to kill fleas and ticks. In this respect, the active chemical ingredients and the inert ingredient from which the spheres 9 are formed, may be the same as those disclosed in U.S. Pat. No. 3,687,114.

Because of the elastic expandability of the spaced coils 7 forming the ring, two adjacent coils 7 may be spread sufficiently to permit insertion of a sphere 9, with additional spheres spaced circumferentially about the endless ring 8 as illustrated in FIG. 2. The spheres 9 may be relatively hard, or may be formed from appropriate foam-type materials impregnated with a variety of different types of insect repellents, all as described in U.S. Pat. No. 4,047,505.

Figure 3:
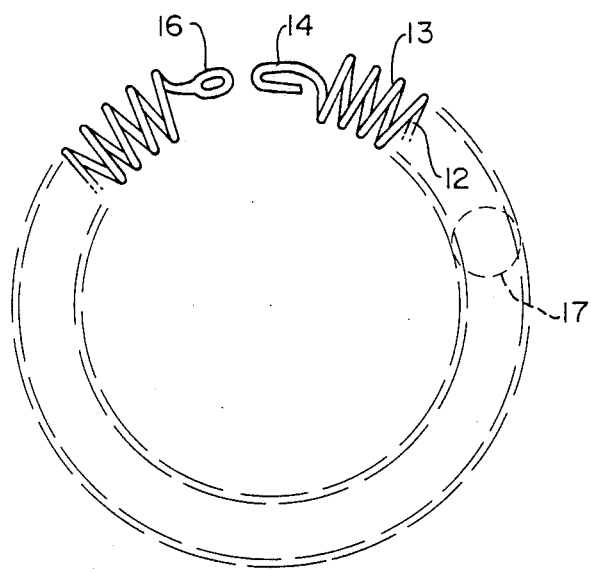
FIG. 3 is a plan view of another embodiment of the elastically resilient collar of the invention in which the opposite ends of the elongated spirally wound coils are provided with attachment means, the collar structure being manufactured either from the same material as the structure illustrated in FIG. 1, or the same material as the structure illustrated in FIG. 2.

In the embodiment of the invention illustrated in FIG. 3, the strip 12 is formed from an elongated metallic or synthetic resinous material, the elongated strip being spirally wound to provide spirally wound coils 13, with the opposite ends of the elongated strip being detachable in this embodiment of the invention, one end of the strip being provided with a hook-like configuration 14, while the opposite end is provided with an eye 16 in which the hook 14 may be engaged so as to connect the opposite ends of the elongated elastically resilient collar structure so as to form the endless ring described above. It will of course be apparent that the elongated strip 12 may be fabricated from the same type of material from which the structure illustrated in FIG. 1 is formed, i.e., a synthetic resinous material having the insect killing medicament impregnated therein or carried thereby, or a metallic strip of the type illustrated in FIG. 2, and adapted to receive the insect killing medicament in the form of spheres 17 spaced about the circumference of the endless ring formed by the strip 12. In the interest of clarity, only one such sphere 17 is illustrated in this embodiment. It will of course be understood that additional such spheres may be incorporated within the endless ring.

Figure 4:
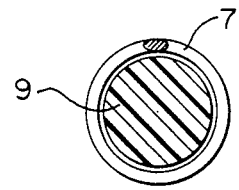
FIG. 4 is a cross-sectional view taken in the plane indicated by the line 4—4 in FIG. 2.
Figure 5:
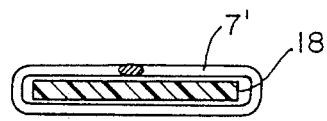
FIG. 5 is a cross-sectional view a collar structure formed from a spirally wound strip having generally rectangular coils.
Figure 6:
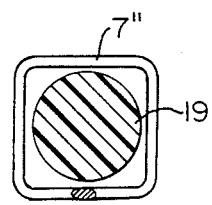
FIG. 6 is a cross-sectional view illustrating an elastically resilient structure in which the coils are generally square in their configuration.

Referring to FIGS. 4, 5 and 6, these illustrations indicate that the cross-sectional configurations of the coils 7 may be circular as illustrated in FIG. 4, and the insect killing medicament may be formed in a sphere as illustrated in FIG. 2, while in FIG. 5, the cross-sectional configuration of the coils 7' are configured to present a generally rectangular configuration as illustrated, and the body of medicament 18 may constitute an elongated flat strap formed from an appropriate synthetic resinous material impregnated with the appropriate insect killing medicament. As illustrated in FIG. 5, the elongated strap 18 has a generally rectangular cross-section, while longitudinally, the strap 18 is equivalent in length to the mean diameter of the endless ring in its contracted form, but the ends of the strap 18 are unattached to one another so that as the endless ring expands to fit larger sizes of animals, there is provided the opportunity for relative slidable motion between the strap 18 and the ring formed by the coils 7'.

Referring to FIG. 6, the embodiment of the invention illustrated in this figure incorporates coils 7" having a generally square configuration in cross-section as illustrated, to thus form a generally square cross-section space within the elongated collar structure, the ends of which are welded as before to form an endless ring within which is contained a body 19 of insect killing medicament, the body 19 being formed spherically as illustrated in FIG. 2, or alternatively, the body 19 constituting an elongated cylindrical structure having a length equivalent to the mean circumference of the contracted endless ring into which the coils 7" are formed when the ends of the strip from which the ring is formed are connected. Thus the opposite ends of the elongated body of insect killing medicament are unattached to one another, so as to permit relative movement between the adjacent surfaces of the body of insect killing medicament and the inner periphery of the coils 7" when the endless ring is expanded between or contracted to fit different size animals. It will of course be obvious that the embodiments of the invention illustrated in FIGS. 1, 2 and 3 may incorporate coils having the configurations illustrated in FIGS. 4, 5 and 6.

I claim:

1. In combination:
   (a) an elastically resilient collar including a spirally coiled section that is elastically expandable; and
   (b) at least one body including an insecticide retained within said spirally coiled section whereby insect-killing vapors from said insecticide emanate from said spirally coiled section.

2. The combination according to claim 1, in which said spirally coiled section of said collar comprises an elastically expandable endless ring.

3. The combination according to claim 1, in which said elastically expandable spirally coiled section of said collar is formed from a synthetic resinous material.

4. The combination according to claim 1, in which said elastically expandable spirally coiled section of said collar is formed from metal.

5. The combination according to claim 1, in which said elastically resilient collar comprises an elongated strip formed into successive interconnected spirally wound and elastically expandable coils to form an elongated space defined by said coils, and said at least one body including said insecticide is retained within said space by said coils.

6. The combination according to claim 5, in which said at least one body including an insecticide comprises a sphere retained within said elongated space by said elastically expandable coils.

7. The combination according to claim 5, in which said at least one body including an insecticide comprises a multiplicity of separate spheres retained at spaced intervals within said elongated space by said successive interconnected coils.

8. The combination according to claim 5, in which said at least one body including an insecticide comprises an elongated strap-like body retained within said elongated space defined by said successive interconnected coils and displaceable longitudinally in relation to said interconnected coils when said collar is elastically expanded.

9. The combination according to claim 5, in which said at least one body including an insecticide comprises an elongated flexible rod-like body of generally cylindrical cross-section retained within said elongated space defined by said successive interconnected coils and displaceable longitudinally in relation to said interconnected coils when said collar is elastically expanded.

10. The combination according to claim 5, in which said successive interconnected spirally wound and elastically expandable coils are substantially circular in their configuration.

11. The combination according to claim 5, in which said successive interconnected spirally wound and elastically expandable coils are substantially rectangular in their configuration.

12. The combination according to claim 5, in which said successive interconnected spirally wound and elastically expandable coils are substantially square in their configuration.

13. The combination according to claim 5, in which means are provided on opposite ends of said elongated spirally wound strip selectively interconnectable to convert said elongated spirally wound strip into an elastically expandable endless ring.

14. The combination according to claim 5, in which opposite ends of said elongated spirally wound strip are permanently interconnected to convert said elongated spirally wound strip into an elastically expandable endless ring.

15. The combination according to claim 10, in which said at least one body including an insecticide comprises a multiplicity of spaced spheres retained within said elongated space defined by said coils, individual spheres being retained against longitudinal displacement within said elongated space by a pair of adjacent coils.

16. The combination according to claim 11, in which said at least one body comprises a generally rectangular strap-like body slidably disposed in said elongated generally rectangular space formed by said successive interconnected spirally wound coils whereby relative longitudinal displacement may occur between said strap-like body and said spirally wound coils.

17. The combination according to claim 12, in which said at least one body comprises a generally square body slidably disposed in said elongated substantially square space formed by said successive interconnected spirally wound coils whereby relative longitudinal displacement occurs between said strap-like body and said spirally wound coils.

* * * * *